3,412,980
FLOATING GEAR SCREW JACK
Herbert Pikoske, Union Grove, Wis., assignor to Walker Manufacturing Company, Racine, Wis., a corporation of Delaware
Filed Oct. 25, 1966, Ser. No. 589,419
1 Claim. (Cl. 254—99)

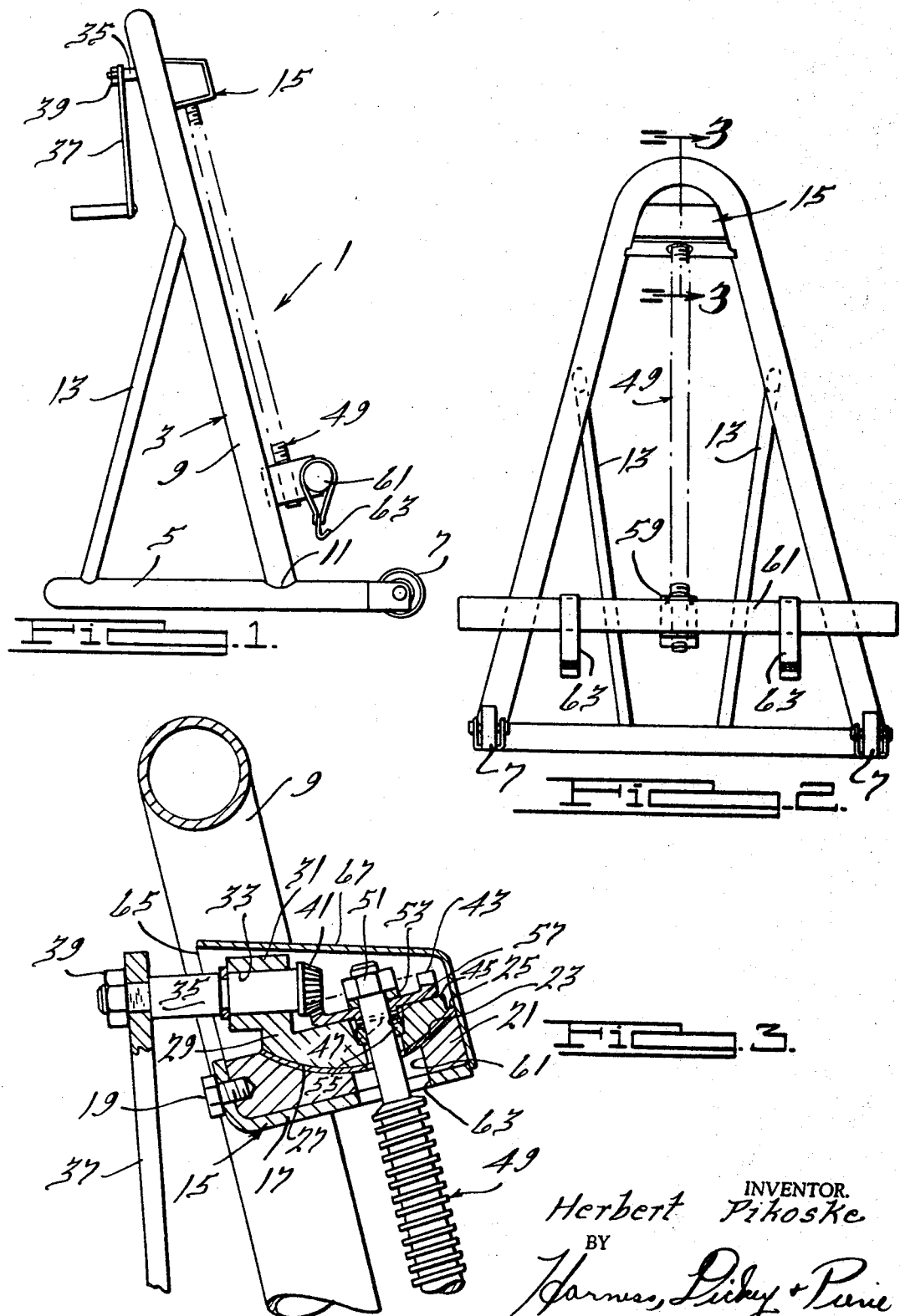

ABSTRACT OF THE DISCLOSURE

An A-frame jack has a fixed cross piece and brace that carries a saddle with a spherical seat in which is received a spherically surfaced gear carrier that supports a pinion and drive gear for the lift screw.

---

My invention relates to lifting devices and in particular, to jacks of the type often used to lift one end of an automobile or similar vehicle by means of engagement with the bumper or other projecting part of the vehicle.

It is an object of my invention to provide a screw-type lifting device which automatically adjusts itself to change in the lateral or horizontal position of the object being lifted, such as the bumper of an automobile.

The invention accomplishes this and other objects by means of a construction in which the lifting screw is suspended on a spherical bearing that provides a universal joint action so that it can shift laterally to accommodate itself to transverse or lateral movements of the object being lifted.

The invention is illustrated in the accompanying drawings in which:

FIGURE 1 is a side elevation of simplified form of jack embodying the invention;

FIGURE 2 is a front elevation taken from the right of FIGURE 1, and

FIGURE 3 is an enlarged cross section taken along the line 3—3 of FIGURE 2.

The screw jack 1 shown in the drawings has a frame 3 which comprises a U-shaped base member 5 that has wheels 7 attached at the projecting ends thereof. An A-shaped vertically extending frame section 9 is welded at its lower ends 11 to the section 5 and is supported in an inclined position by means of the struts 13 which are welded to it and to the base section 5. Extending horizontally between the legs of the section 9 and rigidly secured adjacent the top of it by suitable means such as welding, is a mounting bracket 15 which has a horizontal leg 17 that projects at right angles to the plane defined by the frame element 9. Secured in the bracket 15 by suitable means such as bolts 19, is a saddle member 21 which has a top surface 23 that is of a spherical contour. Fitted on top of the surface 23 is a spherical layer of lubricating material preferably in the form of a Teflon bearing sheet 25. Fitted on and engaging the layer 25 is the spherical bottom surface 27 of a gear housing 29 and this has an upstanding section 31 containing a bore 33 which serves as a journal for the pinion member 35. The outer end of the pinion member 35 is attached by means of a suitable torque transmitting connection to the handle 37 and held in place on the handle by the nut 39.

The pinion gear teeth 41 on pinion element 35 are in mesh with and drive the bevel teeth of the screw shaft drive gear 43 which is rotated on the top surface 45 of the gear housing 29. A torque transmitting drive pin 47 extends through a hub on the bottom of the drive gear 43 and through the top end of the power screw 49. The power screw is carried on the top of the bevel gear 43 by means of the nut 51 which is threaded onto the end of the power screw and bears against the washer 53. A bearing 55 transmits the vertical load of the power screw 49 into the bottom of the recess 57 in the gear housing 29.

The power screw 49 threads through a lift block 59 which is secured to the horizontal lift bar 61 which in turn carries a pair of laterally shiftable lifting saddles 63 that can engage the bottom of a bumper or other projecting portion of a vehicle to be lifted by the jack 1. As the power screw 49 is rotated the cross bar 61 will be raised or lowered carrying with it the saddle 63 and the load to be lifted.

The top end of the power screw 49 extends through suitable apertures in the gear housing 29, the Teflon layer 25, the saddle 21, and bracket leg 17. The opening 61 in the saddle 21 and the opening 63 in the bracket leg 17 are enlarged suitably to accommodate swinging movement of the gear housing 29 on the saddle 21. It will be seen that this permits the power screw 49 to shift to a wide variety of positions that are angularly displaced from the axial position as shown in the drawings. The opening 65 behind cover 67 provides room for rocking and shifting of the gear housing 29 and pinion member 35 with the screw 49.

In operation, the jack 1 is moved on wheels 7 to the point of use such as an automobile to be lifted. The handle 37 is rotated turning pinion 35 which rotates gear 43 and this acts through drive pin 47 to rotate the screw 49 and raise the saddles 63. After the hooks on the saddles have engaged the bottom of a bumper and the automobile is lifted the bumper moves horizontally away from the jack. In the present construction this is accommodated by an outward swing of the screw 49 as it and the gear housing 29 rock by virtue of the universal joint action provided by the spherical surface on saddle 21.

Modifications may be made without departing from the spirit and scope of the invention. For example ratchet means can readily be attached to the top end of the screw 49 to prevent undesired reverse rotation.

I claim:
1. In a lifting device:
   a frame including a pair of horizontally spaced vertically extending side legs,
   a horizontally extending mounting bracket rigidly secured to and between said side legs adjacent to but below the top of the frame,
   said bracket including a shelf section extending substantially normally to a plane defined by said legs,
   a saddle mounted on said bracket and having a spherical top seating surface,
   a gear housing having a spherical bottom surface received in said seating surface and having an upstanding section extending in a generally vertical direction and located above said saddle and bracket,
   a shaft mounted in said upstanding section and projecting between said legs above said bracket,
   handle means attached to the shaft for rotating it and extending generally in the direction of said legs,
   a pinion gear mounted on said shaft, a drive gear supported in said housing and meshing with the pinion gear and rotated thereby, said drive gear, gear housing, and saddle having aligned apertures, a lift screw extending through said apertures and secured for rotation and against axial movement to said drive gear and suspended thereon to transmit load thereon into the top face of the drive gear and thence into the gear housing, saddle, and bracket.

References Cited

UNITED STATES PATENTS 515,158   2/1894   O'Neill _____ 254—99

FOREIGN PATENTS 433,065   4/1948   Italy.
1,032,608   4/1953   France.

OTHELL M. SIMPSON, *Primary Examiner.*